(12) United States Patent
Wildfeuer

(10) Patent No.: US 10,933,898 B2
(45) Date of Patent: Mar. 2, 2021

(54) INTEGRAL TRANSPORT SYSTEM FOR TRANSIT CASE

(71) Applicant: Raytheon Company, Waltham, MA (US)

(72) Inventor: Jeffrey T. Wildfeuer, Salem, NH (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/282,220

(22) Filed: Feb. 21, 2019

(65) Prior Publication Data

US 2020/0269892 A1 Aug. 27, 2020

(51) Int. Cl.
*B62B 1/20* (2006.01)
*B62B 5/06* (2006.01)

(52) U.S. Cl.
CPC ............... *B62B 1/20* (2013.01); *B62B 5/067* (2013.01); *B62B 2205/14* (2013.01)

(58) Field of Classification Search
CPC .......... B62B 1/20; B62B 5/06; B62B 2205/14
See application file for complete search history.

(56) References Cited

U.S. PATENT DOCUMENTS

| | | |
|---|---|---|
| 1,242,418 A | 10/1917 | Booth |
| 1,808,864 A | 6/1931 | Pinheiro |
| 2,422,331 A | 6/1947 | Bates |
| 2,431,834 A | 12/1947 | Sinclair |
| 2,439,660 A | 4/1948 | Keil |
| 2,471,462 A | 5/1949 | Toth |
| 2,484,951 A | 10/1949 | Kubo |
| 2,509,575 A * | 5/1950 | Mingo .................. B62B 5/0083 280/38 |
| 2,562,686 A * | 7/1951 | Altemus ................ A45C 5/146 280/38 |
| 2,577,951 A | 12/1951 | Cortsen |
| 2,596,578 A * | 5/1952 | McIntyre .................. B62B 3/02 280/47.17 |
| 2,727,751 A | 12/1955 | Souris |
| 2,800,335 A | 7/1957 | Clapp |
| 2,925,283 A * | 2/1960 | Stilger .................... B62B 1/125 280/37 |
| 3,352,568 A * | 11/1967 | Ahlf ........................ A45C 5/146 280/35 |
| 3,552,760 A | 1/1971 | Sine |
| 3,960,252 A * | 6/1976 | Cassimally ............ A45C 5/146 190/18 A |

(Continued)

*Primary Examiner* — Bryan A Evan

(57) ABSTRACT

A portable payload carrier (e.g., military transit case) comprises a housing for supporting at least one payload therein, and a ground transport assembly coupled to the housing comprising a first transport unit (e.g., cover) in support of a wheel assembly. The wheel assembly can comprise a wheel and at least one wheel support structure configured to support the wheel about the first transport unit. The wheel assembly can be operable between a stowed configuration and a deployed configuration for transporting the portable payload carrier about a ground surface via the wheel by a user. A handle transport assembly can be coupled to an opposing side of the housing, and can include a deployable handle assembly for lifting and moving the portable payload carrier. The wheel and handle assemblies can be collapsible to maintain a form factor of the portable payload carrier when in the stowed configuration.

24 Claims, 6 Drawing Sheets

(56) References Cited

U.S. PATENT DOCUMENTS

| | | |
|---|---|---|
| 4,401,313 A | 8/1983 | Filas |
| 4,575,109 A | 3/1986 | Cowdery |
| 4,781,396 A | 11/1988 | King |
| 5,253,739 A | 10/1993 | King |
| 5,433,462 A | 7/1995 | Groleau |
| 5,758,752 A | 6/1998 | King et al. |
| 5,806,878 A | 9/1998 | Mroczka et al. |
| 5,908,202 A | 6/1999 | Leger et al. |
| 5,984,326 A | 11/1999 | Abraham et al. |
| 6,328,331 B1 | 12/2001 | McEnteggart |
| 6,431,580 B1 | 8/2002 | Kady |
| 6,520,514 B2 * | 2/2003 | Clegg ............... A45C 5/14 280/47.26 |
| 6,764,093 B2 | 7/2004 | Allsop et al. |
| 6,929,270 B1 * | 8/2005 | Flagstad ............ B62B 5/0083 280/79.11 |
| 6,991,251 B2 | 1/2006 | Tomchak et al. |
| 7,614,628 B2 | 11/2009 | O'Connor |
| 7,866,686 B2 | 1/2011 | Conaway et al. |
| 8,286,767 B2 * | 10/2012 | Malinowski ........... A45C 5/14 190/115 |
| 9,586,442 B2 * | 3/2017 | Trickle ............... B60B 33/06 |
| 9,636,557 B1 * | 5/2017 | Frank ................ A63B 55/30 |
| 2004/0144606 A1 | 7/2004 | Han |
| 2006/0118376 A1 | 6/2006 | Godshaw et al. |
| 2012/0267208 A1 | 10/2012 | D'Angelo |
| 2017/0129283 A1 * | 5/2017 | Trickle ............... B60B 33/06 |
| 2018/0132447 A1 * | 5/2018 | McGeehan ........... A01K 1/0245 |
| 2018/0156516 A1 * | 6/2018 | Vanderberg ........... A45C 5/14 |
| 2018/0186513 A1 * | 7/2018 | Brunner .............. B62B 1/14 |
| 2019/0256119 A1 * | 8/2019 | Brilhante ............ B62B 1/14 |

* cited by examiner

INTEGRAL TRANSPORT SYSTEM FOR TRANSIT CASE

GOVERNMENT LICENSE RIGHTS

This invention was made with government support under W31P4Q-08-C-0419 awarded by the United States Army. The government has certain rights in the invention.

BACKGROUND

Certain containers or cases for protecting and transporting payload(s) can be very heavy, and can require a number of individuals to lift and move the cases. For instance, military grade transport cases are available in a variety of sizes and shapes for supporting and housing a number of payloads or components therein, such as electronics, power supplies, weapons, munitions, etc. These transport cases are often moved from one location to another for the purpose of transporting the components therein to a needed location. It is not uncommon for a transport case (when loaded) to weigh up to 150 pounds, or even more. This can require a number of individuals to lift and move the transport case, which can pose significant logistical and other problems when moving numerous cases, particularly in small areas or quarters. For example, every time a transport case is required to be moved, the risk of dropping or otherwise mishandling the transport case during transport increases. Any dropping or mishandling of the transport case can potentially damage the cases and the payload (e.g., electronics) supported therein. Other possible problems can relate to the safety of those individuals tasked with moving and transporting such cases. For example, moving and transporting loaded transport cases can subject individuals to injury as these are both bulky and heavy. Moreover, individuals may suffer from fatigue, or even long term injury and/or disability, as a result of lifting and moving such heavy transport cases over time.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
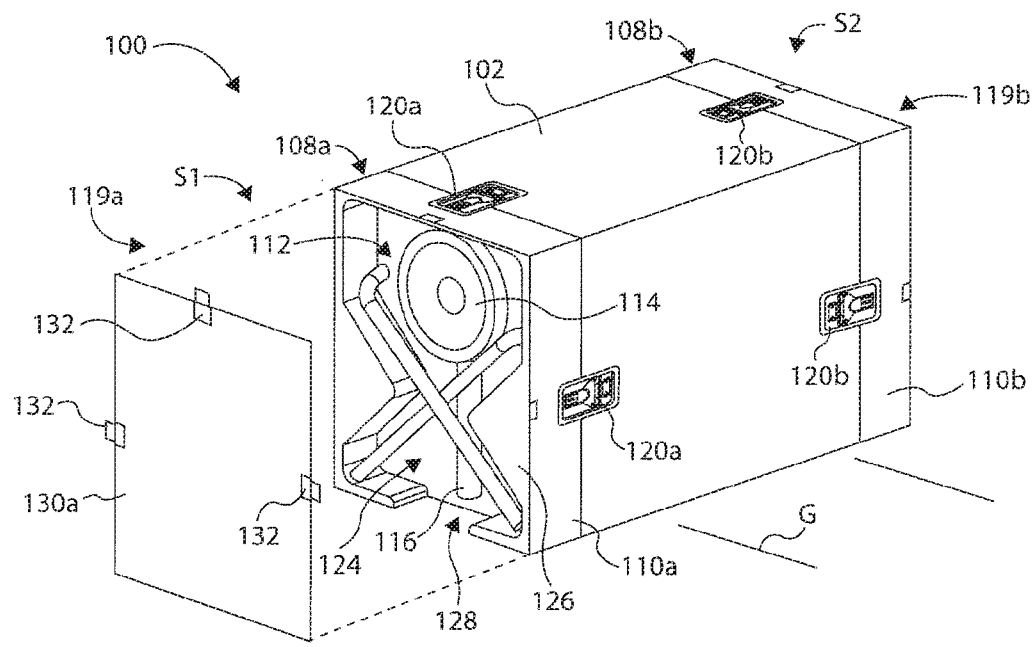
FIG. 1 illustrates a front perspective view of a portable payload carrier in a stowed configuration, in accordance with an example of the present disclosure, with a panel cover shown in an exploded position.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth an integral transport system for a transit case or carrier. The integral transport system can comprise a ground transport assembly for forming and facilitating ground transportation of a portable payload carrier. The ground transport assembly can comprise a transport unit operable to be coupled to a housing of the portable payload carrier; an attachment mechanism supported by the transport unit to facilitate attachment of the transport unit to the housing of the portable payload carrier; and a wheel assembly supported by the transport unit, and comprising a wheel and at least one wheel support structure configured to support the wheel, wherein the wheel assembly is operable between a stowed configuration and a deployed configuration, wherein, when in the deployed configuration, the portable payload carrier is transportable about a ground surface via the wheel by a user.

The present disclosure also sets forth a portable payload carrier having an integral transport system for facilitating user friendly transport of a portable payload carrier. The portable payload carrier can comprise a housing for supporting at least one payload therein: and a ground transport assembly coupled to the housing, and comprising a first transport unit in support of a wheel assembly, the wheel assembly comprising a wheel and at least one wheel support structure configured to support the wheel about the first transport unit, wherein the wheel assembly is operable between a stowed configuration and a deployed configuration, and wherein, when in the deployed configuration, the portable payload carrier is transportable about a ground surface via the wheel by a user.

As part of the integral transport system, the portable payload carrier can further comprise a handle transport assembly having a second transport unit coupled to the housing opposite the first transport unit, the handle transport assembly comprising at least one handle supported by the second transport unit, the at least one handle operable between a stowed configuration and a deployed configuration, such that, when in the deployed configurations of the wheel assembly and the at least one handle, the at least one handle is graspable by a user to lift and move the portable payload carrier about the ground surface via the wheel.

The present disclosure further sets forth a method for transporting a portable payload carrier about a ground surface, comprising obtaining a portable payload carrier comprising a housing and a ground transport assembly coupled to the housing, the ground transport assembly comprising a first transport unit and a wheel assembly supported by the first transport unit, wherein the wheel assembly is in a stowed configuration; moving the wheel assembly from the stowed configuration to a deployed configuration, such that a wheel of the wheel assembly is interfaced to a ground surface; and transporting the portable payload carrier about the ground surface via the wheel.

The portable payload carrier can comprise a handle transport assembly comprising a second transport unit and at least one handle supported by the second transport unit, and the method can further comprise moving the at least one handle from a stowed configuration to a deployed configuration to facilitate lifting the portable payload carrier.

Figure 2:
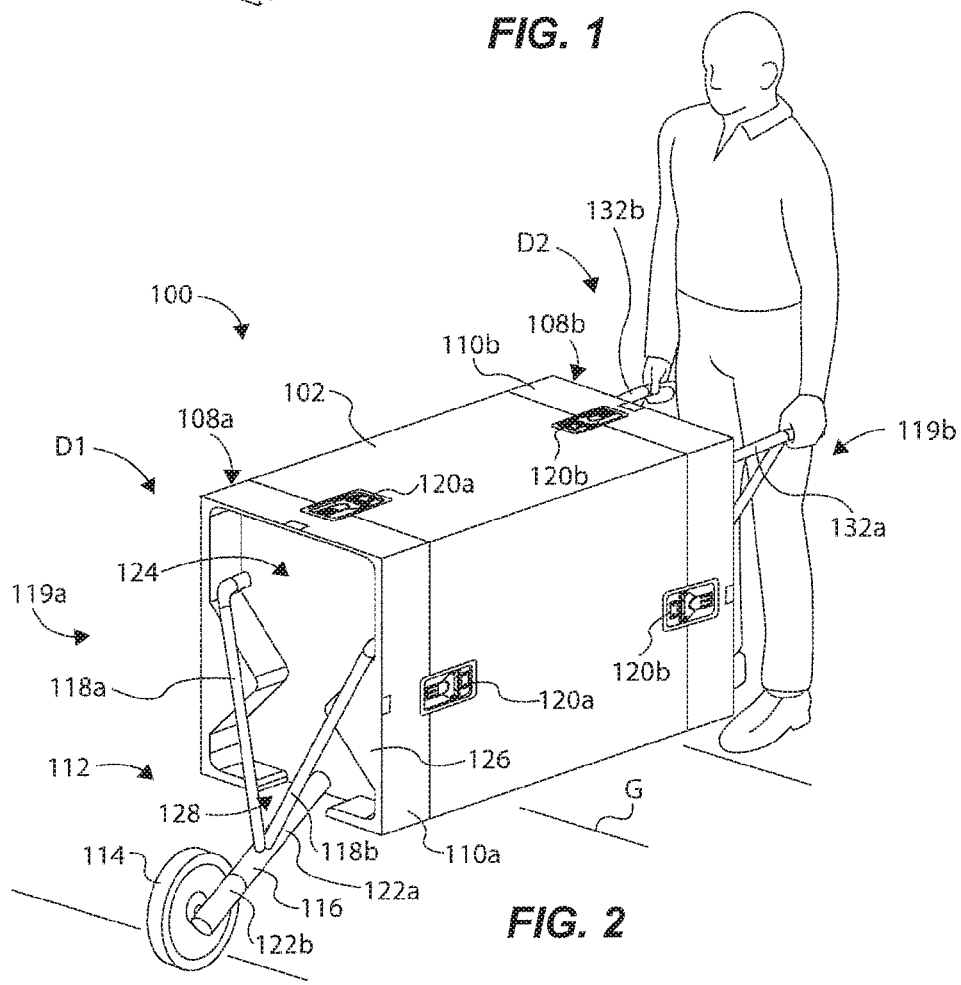
FIG. 2 illustrates a front perspective view of the portable payload carrier of FIG. 1 in a deployed configuration, being transported by an individual.
Figure 6:
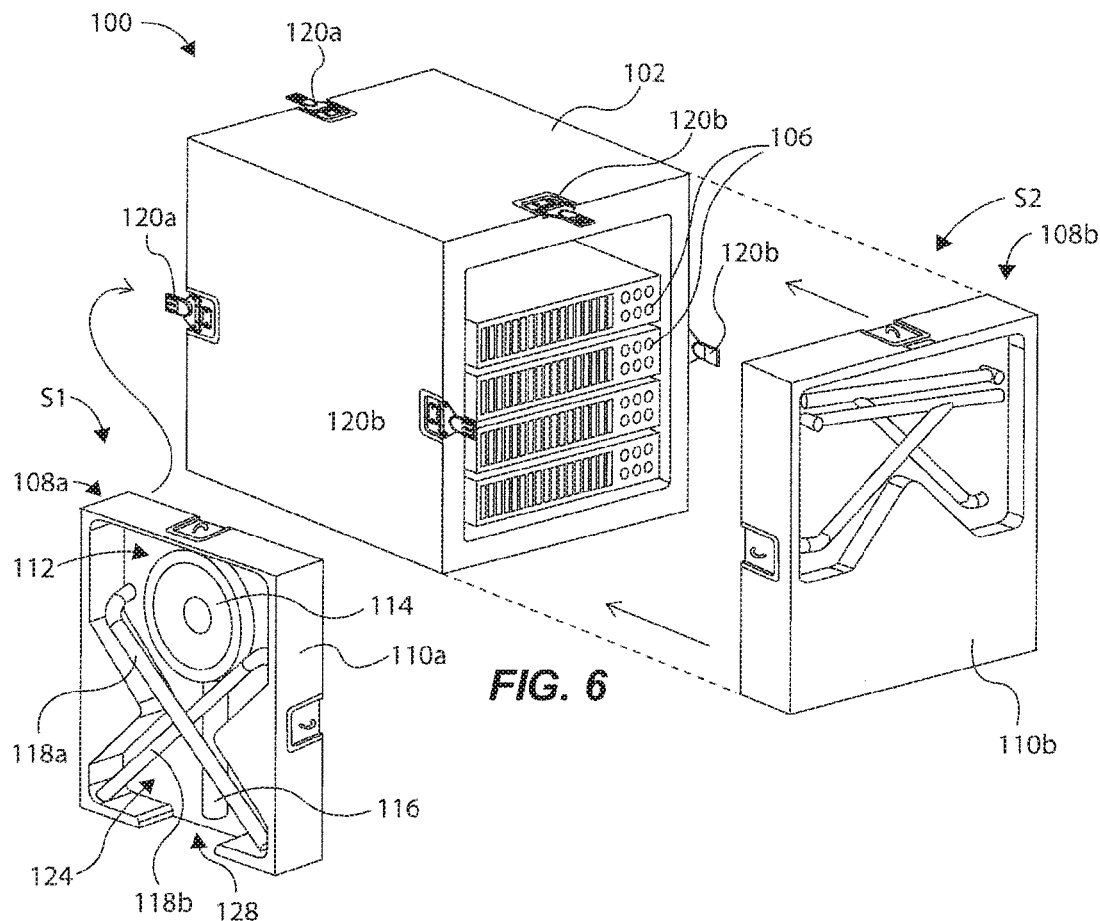
FIG. 6 illustrates the portable payload carrier of FIG. 1, showing first and second transport unit assemblies removed from a housing of the portable payload carrier, and in respective stowed configurations.

To further describe the present technology, examples are now provided with reference to the figures. With reference to FIGS. 1-6, a portable payload carrier 100 is shown and described herein, in accordance with an example of the present disclosure. The portable payload carrier 100 can comprise a housing 102 for receiving therein and supporting at least one payload 106 therein, as shown in FIG. 6. The portable payload carrier 100 can comprise a ground transport assembly 108a that can be coupled to the housing 102. The ground transport assembly 108a can comprise a first transport unit 110a (e.g., a cover) in support of a wheel assembly 112. The wheel assembly 112 can comprise a wheel 114 and a wheel support structure 116 configured to support the wheel 114 about the first transport unit 11a. As further detailed below, the wheel assembly 112 can be operable between a stowed configuration S1 (e.g., see FIGS. 1 and 6) and a deployed configuration D1 (e.g., see FIGS. 2 and 4). Thus, when in the deployed configuration D1, the portable payload carrier 100 can be transported about a ground surface G via the wheel 114 by a user or person, as shown in FIG. 2. Therefore, a single person can lift and transport the portable payload carrier 100 by deploying the wheel assembly 112 and rolling or wheeling the wheel 114 along the ground, thus facilitating transport of the portable payload carrier 100. Advantageously, this can be done without the individual lifting all or part of the portable payload carrier 100 off of the ground with the assistance of another person. Rather, a single individual can transport the portable payload carrier 100, thus solving many of the problems discussed above as pertaining to prior methods. Furthermore, the portable payload carrier 100 provides a single person the capability of transporting much more weight (e.g., a greater or heavier payload) than would otherwise be possible with prior designs.

The wheel assembly 112 can comprise two stabilizer arms 118a and 118b operable with the wheel support structure 116 to support the wheel 114 away from the first transport unit 110a and about a ground surface when the wheel assembly 112 is in the deployed configuration D1. The stabilizer arms 118a and 118b, and the wheel support structure 116, can each comprise a rigid support structure, such as a metal rod or other structural support member sufficiently designed and configured to support the load of the portable payload carrier 100. As further exemplified below, the stabilizer arms 118a and 118b can be pivotally coupled to the first transport unit 110a (e.g., see FIG. 9) to facilitate moving between the stowed and deployed configurations. Alternatively, they can be separate components, or joined together components, that are not joined or coupled (e.g., not pivotally coupled) to the first transport unit 110a, but instead removably coupled to the first transport unit 110a and stowable within the first transport unit 110a when in the stowed configuration S1, such that when removed, the separate components can be removably coupled to one another, if necessary, and removably coupled or attached to the first transport until 110a (e.g., see FIGS. 7 and 8). The other/distal ends of the stabilizer arms 118a and 118b can be removably coupled or attached to the wheel support structure 116 in one or more ways (e.g., see the coupling structure and coupling interface shown in FIG. 10). Note that only one stabilizer arm may be utilized or required, such as one arm that is positioned over-center of the wheel support structure 116, and attachable to the transport unit 110a and the wheel support structure 116. Alternatively, a stabilizer arm may not be required at all, in instances where the wheel support structure 116 alone provides sufficient support to loads imparted thereto.

In one example, the first transport unit 110a can be operable to be coupled to a first side 119a of the housing 102 by an attachment mechanism, such as one or more attachment devices or mechanisms 120a (e.g., over-center latches) that removably couple the first transport unit 110a to the first side 119a of the housing 102. For instance, a pre-existing military transport case typically comprises a housing (like housing 102) and a pre-existing cover that is removably coupled to one side of the housing by a plurality of latches (it is noted that many transport cases have another pre-existing cover removably coupled to the opposite side of the housing). Thus, removal of the pre-existing cover via the latches exposes an inner volume or space of the housing (that supports a payload), so that users can gain access to the inner volume or space for access to the payload (e.g., electronics, power supply, ammunition). Thus, in one example, the first transport unit 110a can replace such pre-existing covers by being fabricated to have a complementary shape and configuration, and a similar or corresponding attachment device or mechanism (e.g., similar latch components) as found on the pre-existing transport case. Therefore, the first transport unit 110 can be considered modular, meaning that it can be used to replace a number of pre-existing covers operable with existing transport cases, and it can be interchanged with other transport units, such as in the case if a current one is destroyed or damaged.

Note that, in the deployed configuration D1, the wheel 114 can extend laterally away from the housing 102, and therefore the wheel 114 is positioned relatively far away from a center of gravity of the housing 102 and the payload therein (as compared to cases that may have a wheel situated underneath the case or housing). This is beneficial because a relatively large weight of a payload can be transported via the housing 102 because the center of gravity of the housing 102 and the payload therein is positioned between the axis of rotation of the wheel 114 and the location at which the user lifts and pushes/pulls the portable payload carrier 100 (e.g. the other lateral side of the housing 102, as in FIG. 2).

Moreover, this location and the size of the wheel 114 allow a user to transport the portable payload carrier 100 over uneven surfaces or terrain, such as various ground terrains having dirt, sand, gravel, etc. For instance, and not intending to be limiting in any way, the wheel 114 can have a diameter of any desired size, such as between 4 and 12 inches, depending on the size of the particular portable payload carrier 100. Such a relatively large wheel, being positioned forward or lateral of the portable payload carrier 100, allows a user to smoothly transport the portable payload carrier 100 over various terrains (as compared to smaller wheels (e.g., those having less than a 2 inch diameter), and as compared to wheels that are positioned below or underneath the housing of a particular payload carrier).

Figure 9:
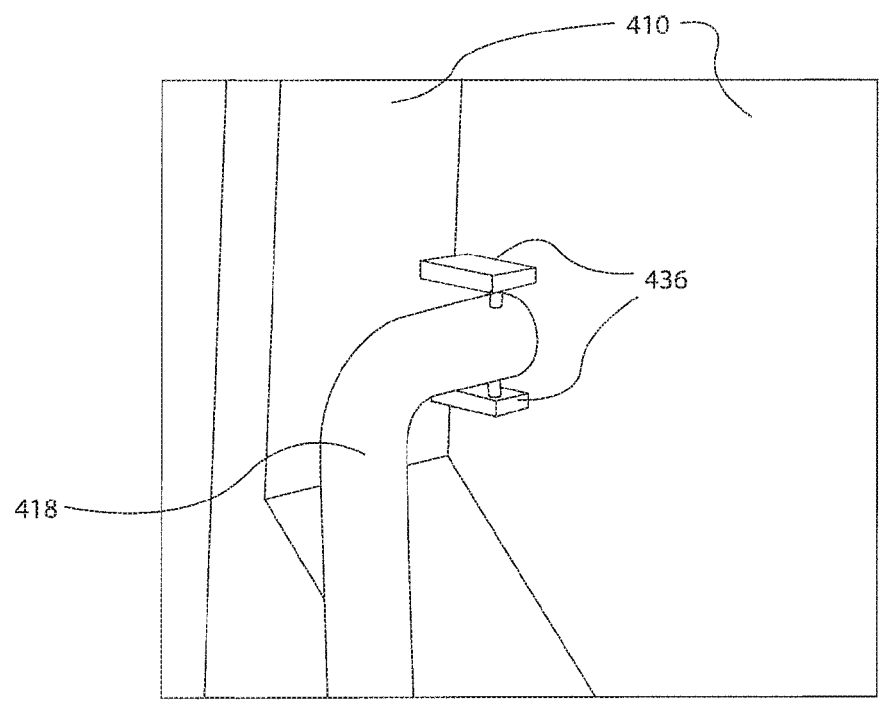
FIG. 9 illustrates a coupling and coupling interface between a support structure and a transport unit of the portable payload carrier of FIG. 1, in accordance with an example of the present disclosure.

In one example, one end of the wheel support structure 116 can be pivotally coupled to the first transport unit 110a by any suitable means (e.g., such the coupling and coupling interface shown in FIG. 9). As shown in FIG. 2, the wheel support structure 116 can comprise first and second support rods or members 122a and 122b that are rotatably coupled to each other by any suitable means. The first support member 122a can be coupled or secured to the first transport unit 110a, and the second support member 122b can be coupled or secured to (and supporting) the wheel 114. In this manner, when the first support rod 122a is rotated from or about the first transport unit 110a to the deployed configuration D1, the second support member 122b (and the wheel 114) can be rotated approximately 90 degrees relative to the first support member 122a, such that the wheel 114 is oriented vertically to interface with the ground G (FIG. 2). Conversely, when moving to the stowed configuration S1, the second support member 122b and the wheel 114 can be rotated relative to the first support member 122a, such that the wheel 114 can be stowed and oriented vertically (but orthogonally relative to the deployed configuration) into or by the first transport unit 110a (FIG. 1). Said another way, the wheel assembly 112 can be collapsible or foldable or retractable into a recessed area 124 formed in the ground transport unit 108a and in this example the first transport unit 11a.

The first support member 122a can be locked in the deployed configuration by any suitable locking means (e.g., see FIGS. 7 and 8), or a suitable locking device can be used (e.g., pin/hole locking device, or other locking or securing mechanism or device).

In another example, the end of the wheel support structure 116 (whether a single rod or member, or two members 122a and 122b) can be removably attachable to the first transport unit 110a by any suitable means, such as via a bracket and fasteners, and/or the wheel support structure 116 can be attached and supported in a bore in the first transport unit 11a.

Note that the stabilizer arms 118a and 118b may be initially removed or rotated away from the wheel 114 before the wheel 114 can be deployed, in this example shown in FIG. 1. Once the wheel 114 is deployed, the stabilizer arms 118a and 118b can then be coupled or secured to the first support member 122b, such as exemplified in FIG. 10.

Note that two or more wheels may be utilized as part of a wheel assembly of the present disclosure to provide greater stability than a single wheel (and one or more of such wheels can be omnidirectional). However, a single wheel (e.g., 114) provides the advantage of a single user being able to more easily maneuver the portable payload carrier when turning or pivoting, which is advantageous in close quarters for a single user.

In one example, the first transport unit 110a can comprise a recessed area 124 for retaining or housing or storing the wheel assembly 112 when in the stowed configuration S1. The recessed area 124 can be a cavity or recess formed (e.g., molded) into the body of the first transport unit 11a. The recessed area 124 can be considered a cavity defined by recessed surfaces that are formed inwardly from an outer surface 126 of the first transport unit 110a. The recessed area 124 can include a support passageway 128 formed about a bottom or lower area of the recessed area 124 in a wall (i.e., the wall can comprise a notch formed therein) to allow passage and to provide clearance of the wheel support structure 116 when moved to the deployed configuration D1.

In one example, the ground transport assembly 108a can comprise a cover panel 130a (FIG. 1) removably coupled to a side of the first transport unit 110a via attachment device(s) 132 for covering the recessed area 124 and the wheel assembly 112 when stowed. The attachment device(s) 132 are shown generically as boxes, but it should be appreciated that the attachment device(s) 132 can be latches, fasteners, straps, or any other device, mechanism or system that can be used to removably couple the cover panel 130a to the first transport unit 11a. The cover panel 130a can be operable by a user to uncover the recessed area 124 for access to the wheel assembly 112, so that a user can deploy the wheel assembly 112 for ground transportation. The cover panel 130a can be attached to cover the wheel assembly 112, and in some cases, help to reduce the likelihood of the wheel assembly 112 from inadvertently falling out, which can cause damage or injury, or which can create foreign object debris (FOD).

In one example, the portable transport carrier 100 can be lifted by a user via an integral handle attached to the housing 102, such as on the sides, or top, or bottom of the housing 102, these being coupled to the housing in any suitable manner. Alternatively, and in another example for lifting the portable transport carrier 100, the portable transport carrier 100 can comprise a handle transport assembly 108b coupled to the housing 102 at an opposite lateral side from the where the ground transport assembly 108a is attached to the housing 102. The handle transport assembly 108b can facilitate lifting and moving/wheeling the portable transport carrier 100 about the ground G, as exemplified in FIG. 2.

In one example, the handle transport assembly 108b can comprise a second transport unit 110b coupled to the housing 102 on an opposite side from the first transport unit 110a. Thus, the housing 102 can have a left side and a right side, where the ground transport assembly 108a is attached to the left side, and the handle transport assembly 108b is attached to the right side.

The handle transport assembly 108b can comprise two handles 132a and 132b supported or stored by the second transport unit 110b (e.g., a cover or door or enclosure panel). The handle transport assembly 108b can be operable between a stowed configuration S2 (e.g., FIGS. 3 and 6) and a deployed configuration D2 (e.g., FIGS. 2 and 4). Thus, when in the deployed configuration D2, the portable payload carrier 100 is transportable about the ground surface G via the wheel 114 by a user or person grasping the handles 132a and 132b for lifting and moving the portable payload carrier 100, as illustrated in FIG. 2. In this way, the portable payload carrier 100 can comprise and can operate as a compound machine, where the wheel is forward of the payload, and where the handles are rearward of the payload, to provide a lever type of mechanical force multiplier in order to transport many times the amount of weight as could be otherwise lifted and carried by a person. More specifically, the portable payload carrier 100 can be and operate as a Type 2 lever compound machine with the housing 102, the ground transport assembly 108a and/or the handle transport assembly 108b, and the payload comprising a resistance arm, the handles 132a and 132b comprising the effort arm(s), and the wheel comprising the fulcrum allowing the portable transport device 100 to pivot about the ground or ground surface.

With further specificity, the handles 132a and 132b can each comprise a plurality of support members or rods 134a and 134b (FIG. 4) that form or define the respective handles 132a and 132b. Alternatively, a particular handle can comprise a single support member or rod that can be coupled to the second transport unit 110b. As further exemplified below, handles 132a and 132b can be pivotally coupled to the second transport unit 110b (FIG. 9), or they can be merely contained or supported by the second transport unit 110b when in the stowed configuration S2 (and then removed and coupled to the second transport unit 110b for grasping and lifting). Alternatively, a single handle could be utilized (instead of two), such as a horizontal cross bar that can be pivotally coupled to the second transport unit 110b, for instance, in any suitable manner. Further alternatively, two handles could be attached to respective sides of the second transport unit 110b, so that two users can simultaneously lift and transport the portable payload carrier 100.

The second transport unit 110b of the handle transport assembly 108b can be coupled to a second lateral side 119b of the housing 102 by an attachment mechanism, such as one or more attachment mechanisms or devices 120b (e.g., over-center latches) that removably couple the second transport unit 110b to the housing 102 opposite from, or on the other side from, the first transport unit 11a. Similarly as discussed above regarding the first transport unit 110a, in one example, the second transport unit 110b can replace a pre-existing cover by being fabricated to have a complementary shape and configuration and similar attachment devices, such as latch components, as the pre-existing cover of the pre-existing transport case. Thus, a particular pre-existing housing (like 102) can have two pre-existing covers removed from the housing, and then the first and second transport units 110a and 110b can be attached to the housing 102 via the attachment devices 120a and 120b, thereby replacing left and right covers of the pre-existing transport case. The first and second transport units 110a and 110b can be removably coupled.

Note that, in the deployed configuration D2, the handles 132a and 132b can extend laterally away from the housing 102 (in an opposite lateral direction relative to the direction of the wheel 114 extending from the first transport unit 110a). The handles 132a and 132b can pivotally couple to the second transport unit 110b by any suitable means (such as shown in FIG. 9 regarding a stabilizer arm 218), or by other means, such as discussed below regarding FIGS. 7 and 8.

In one example, the second transport unit 110b can comprise a recessed area 136 for supporting or retaining or housing the handles 132a and 132b when in the stowed configuration S2. The recessed area 136 can be a cavity or recess formed (e.g., molded) into the body of the second transport unit 110b. The recessed area 136 can be considered a cavity defined by recessed surfaces that are formed inwardly from an outer surface 138 of the second transport unit 110b (FIG. 4). Thus, as shown when comparing the stowed configuration S2 of FIG. 3 with the deployed configuration D2 of FIG. 4, the handles 132a and 132b can be collapsible or foldable or retractable into the recessed area 136 of the second transport unit 110b when moved to the stowed configuration S2.

In one example, the ground transport assembly 100 can comprise a cover panel 130b (FIG. 3) removably coupled to the second transport unit 110b via attachment device(s) 140. Similar to cover panel 130a, the cover panel 130b can be operable by a user to cover and uncover the recessed area 136 for access to the handles 132a and 132b, so that a user can access the handles 132a and 132b to move them to the deployed configuration D2. The cover panel 130b helps to reduce the likelihood of the handles 132a and 132b from accidentally deploying or falling out, depending upon their connection configuration.

Notably, when in the stowed configurations, the portable payload carrier 100 maintains its form factor, which can mean that the portable payload carrier 100 can keep or maintain its three-dimensional, generally rectangular shape (or cuboid shape having 6 faces or sides). Said another way, there are no components devices that extend away from the form factor or envelope of the portable payload carrier 100 in the stowed configuration (e.g., the wheel and handles are entirely stowed inside of or within the portable payload carrier 100). This is beneficial when numerous portable payload carriers are stacked on top of each other and/or next to each other, because it reduces or minimizes an envelope size of each carrier so that they can be orderly stacked together in close quarters, and without the risk of damage to any wheels or handles that would otherwise be extending out from a housing or case as in prior designs.

Figure 7:
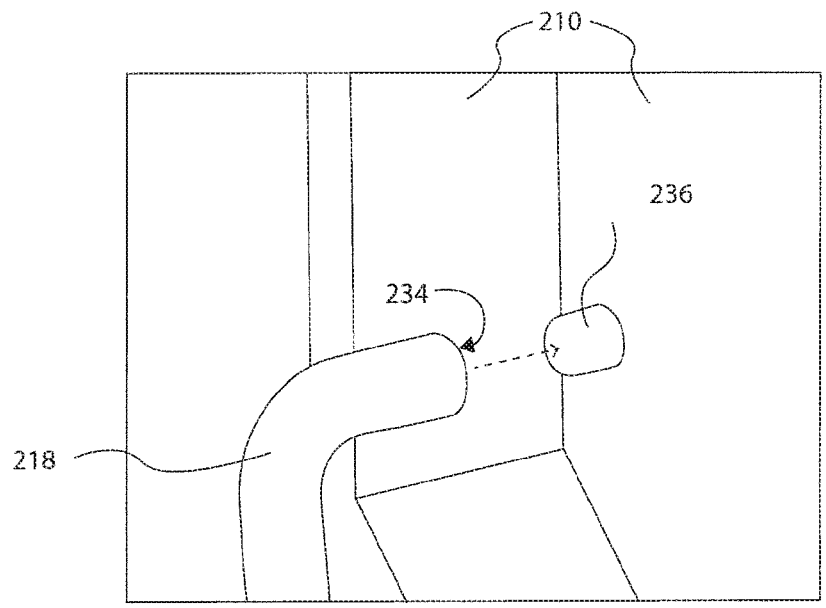
FIG. 7 is an exploded view of a coupling and coupling interface between a support structure and a transport unit of the portable payload carrier of FIG. 1, in accordance with an example of the present disclosure.
Figure 8:
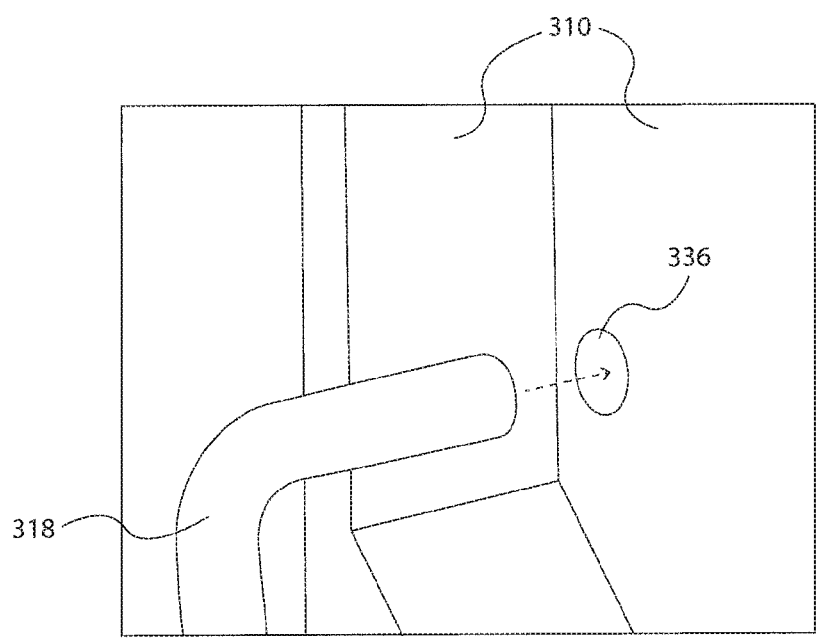
FIG. 8 is an exploded view of a coupling and coupling interface between a support structure and a transport unit of the portable payload carrier of FIG. 1, in accordance with an example of the present disclosure.

FIGS. 7-9 shown various means for coupling and locking a support structure to a transport unit (e.g., the first or second transport units 110a and/or 110b of portable payload carrier 100). For instance, "a support structure" can be considered one of each of the stabilizer arms 118a and 118b, the wheel support structure 116, and the handles 132a and 132b that can be coupled to a respective transport unit for moving such support structure between the respective stowed and deployed configurations. For instance, as shown in FIG. 7, an end of a stabilizer arm 218 can have a bore 234 formed through the end of the stabilizer arm 218. The bore 234 can receive and interface with a post 236 supported on and extending from a surface of a transport unit 210 (similar to the first transport unit 110a, or even the second transport unit 110b in the case where a handle is attachable to the second transport unit 110b). The post 236 can include a spring pin lock (not shown) or other compliant device that operates to facilitate "snapping-in" the stabilizer arm 218 to the post 236. Such configuration can "lock" the stabilizer arm 218 to the transport unit 210 in the deployed configuration to resist a generally upward bending moment acting on the stabilizer arm 218 due to the weight of a portable payload carrier (and the payload therein) via the wheel and wheel support structure (e.g., 114, 116).

In another example illustrated in FIG. 8, an end of a stabilizer arm 318 can be received by a bore 336 formed into a transport unit (similar to first transport unit 110a, or second transport unit 110b in the case of coupling a handle to the transport unit 110b). Such configuration can "lock" the stabilizer arm 318 to the transport unit 310 to resist an upward bending moment acting on the stabilizer arm 218 due to the weight of a portable payload carrier (and the payload therein) via the wheel and wheel support structure (e.g., 114, 116).

In another example illustrated in FIG. 9, an end of a stabilizer arm 418 can be pivotally coupled to a pivot support device 436, which can be a pair of brackets supporting a pin that extends through an aperture of the stabilizer arm 418. In this manner, the stabilizer arm 418 can be pivoted about the pivot support device 436 between the stowed and deployed configurations (e.g., S2 and D2). Such configuration can "lock" the stabilizer arm 418 to the transport unit 410 to resist a generally upward bending moment acting on the stabilizer arm 418 due to the weight of a portable payload carrier (and the payload therein) via the wheel and wheel support structure (e.g., 114, 116).

Figure 10:
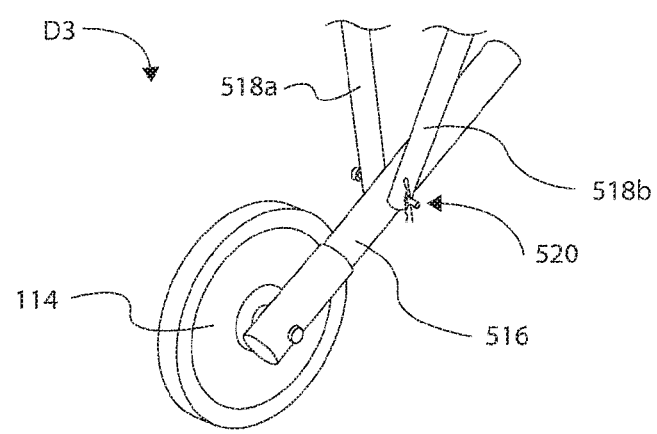
FIG. 10 illustrates a coupling and coupling interface between support arms and a support structure of a wheel assembly of the portable payload carrier of FIG. 1, in accordance with an example of the present disclosure.

FIG. 10 shows one example of coupling stabilizer arms 518a and 518b (similar to stabilizer arms 118a and 118b described above) to a wheel support structure 516 (like wheel support structure 116 described above) in support of a wheel 514 (like wheel 114 described above) when in the deployed configuration D3. Ends of the stabilizer arms 518a and 518b can be coupled to the wheel support structure 516 by a cotter pin coupling system 520 that extends though apertures of the stabilizer arms 518a and 518b, and an aperture of the wheel support structure 516, so that the stabilizer arms 518a and 518b can support and stabilize the wheel support structure 516 when under a load to resist a bending moment acting on the wheel support structure 516.

Figure 11A:
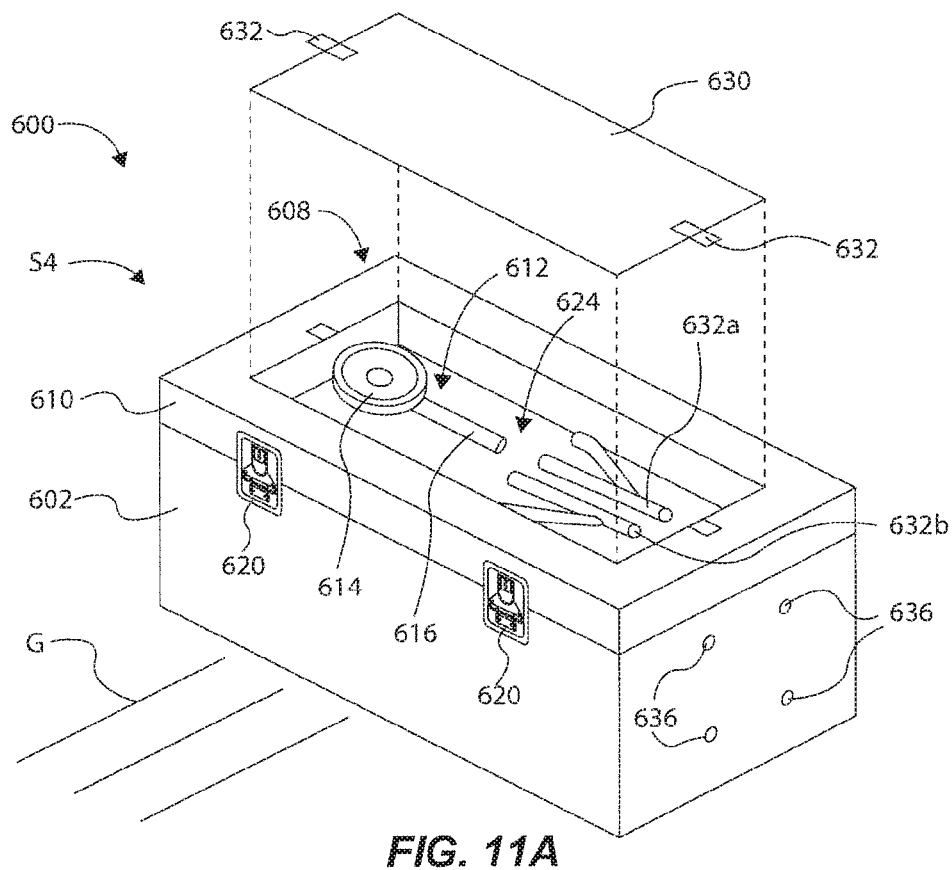
FIG. 11A illustrates a portable payload carrier in a stowed configuration, in accordance with an example of the present disclosure.
Figure 11B:
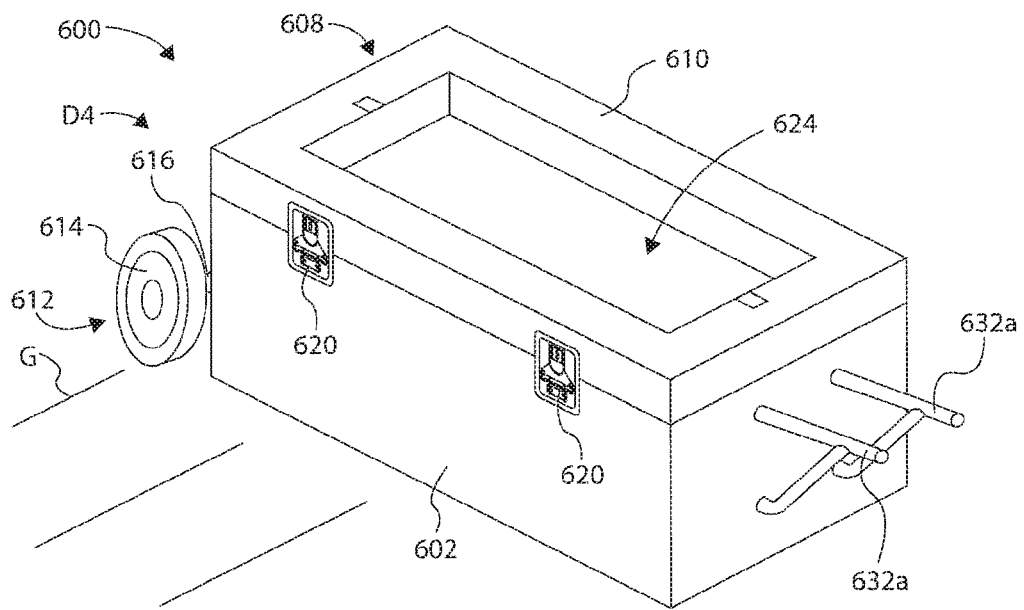
FIG. 11B illustrates the portable payload carrier of FIG. 11A in a deployed configuration.

With reference to FIGS. 11A and 11B, a portable payload carrier 600 is shown and described herein, in accordance with an example of the present disclosure. As an overview, the portable payload carrier 600 can comprise a housing 602 for supporting at least one payload therein (such as with a trunk-type transit case). A transport assembly 608 can be coupled to the housing 602, and can comprise a transport unit 610 (e.g., a cover) in support of a wheel assembly 612. The wheel assembly 612 can comprise a wheel 614 and a wheel support structure 616 configured to support the wheel 614 about the first transport unit 610. The wheel assembly 612 can be operable between a stowed configuration S4 (FIG. 11A) and a deployed configuration D4 (FIG. 11B). Thus, when in the deployed configuration D4, the portable payload carrier 600 is transportable about a ground surface G via the wheel 614 by a user or person (e.g., see FIG. 2). Therefore, a single person can lift and transport the portable payload carrier 600 by rolling or wheeling it along the ground and without the assistance of another person.

The wheel assembly 612 can comprise one or more stabilizer arms (not shown in this example, but like stabilizer arms 118a and 118b described above) operable with the wheel support structure 616 to support the wheel 614 when the wheel assembly 612 is in the deployed configuration D4. The wheel support structure 616 can be removably coupled to a side of the housing 602 in the deployed configuration D2 in a number of suitable ways, such as via fasteners and brackets, a quick-connect device, a hole/post interface (e.g., FIG. 7), a post/bore interface (e.g., FIG. 8), or a pivot support device (e.g., FIG. 9), and can include a lock mechanism to maintain the deployed configuration D4.

In one example, the transport unit 610 can be operable to be coupled to a top side of the housing 602 by an attachment mechanism, such as one or more attachment devices 620 (e.g., over-center latches) that removably couple the transport unit 610 to the housing 602. The transport unit 610 can be a cover that covers or closes the housing 602, and the transport unit 610 can be hinged to the housing 602 by hinges (not shown) on one side, and latched on the other side by attachment devices 620 (like a trunk). The housing 602 can be part of a pre-existing military, commercial or other transport case that includes a pre-existing cover (not shown) that has been removed and replaced by the transport unit 610, similarly as discussed above.

Note that, in the deployed configuration D4, the wheel 614 can extend laterally away from the housing 602, and therefore the wheel 614 is positioned farther away from a center of gravity of the housing 602 and the payload therein (as compared to cases that may have a wheel situated underneath the case or housing). This is beneficial because a relatively large weight can be transported because the center of gravity of the housing 602 and the payload therein is laterally positioned between the axis of rotation of the wheel 614 and the location at which the user lifts and pushes/pulls the portable payload carrier 600 (e.g. the other lateral side of the housing 602). Moreover, the location and size of the wheel 614 can be configured as needed or desired to allow a user to transport the portable payload carrier 600 over uneven surfaces, and/or semi-hard surfaces, such as various terrains of dirt, gravel, etc. For instance, and not intending to be limiting in any way, the wheel 614 can have a diameter of at between 2 and 12 inches, depending on the size of the particular portable payload carrier 600.

The portable transport carrier 600 can be lifted by a user via one or more integral handles (not shown) attached to the housing 602, such as on the sides, or top, or bottom of the housing 602 in a suitable manner, such as in any of the ways described herein. Alternatively, and in one example for lifting the portable transport carrier 600, the transport assembly 608 can comprise two handles 632a and 632b supported or store by the transport unit 610, also as described herein. Thus, the handles 632a and 632b can be stored in a recessed area 624 with the wheel assembly 612 (or stored they can be stored in separate recessed areas). The handles 632a and 632b can be separate components loosely stored in the transport unit 610, or stored via straps, clamps, etc. inside the recessed area 624.

The handles 632a and 632b of the transport assembly 608 can be operable between the stowed configuration S4 and the deployed configuration D4. Thus, when in the deployed configuration D4, the portable payload carrier 600 is transportable about the ground surface G via the wheel 614 by a user or person grasping the handles 632a and 632b.

Figure 3:
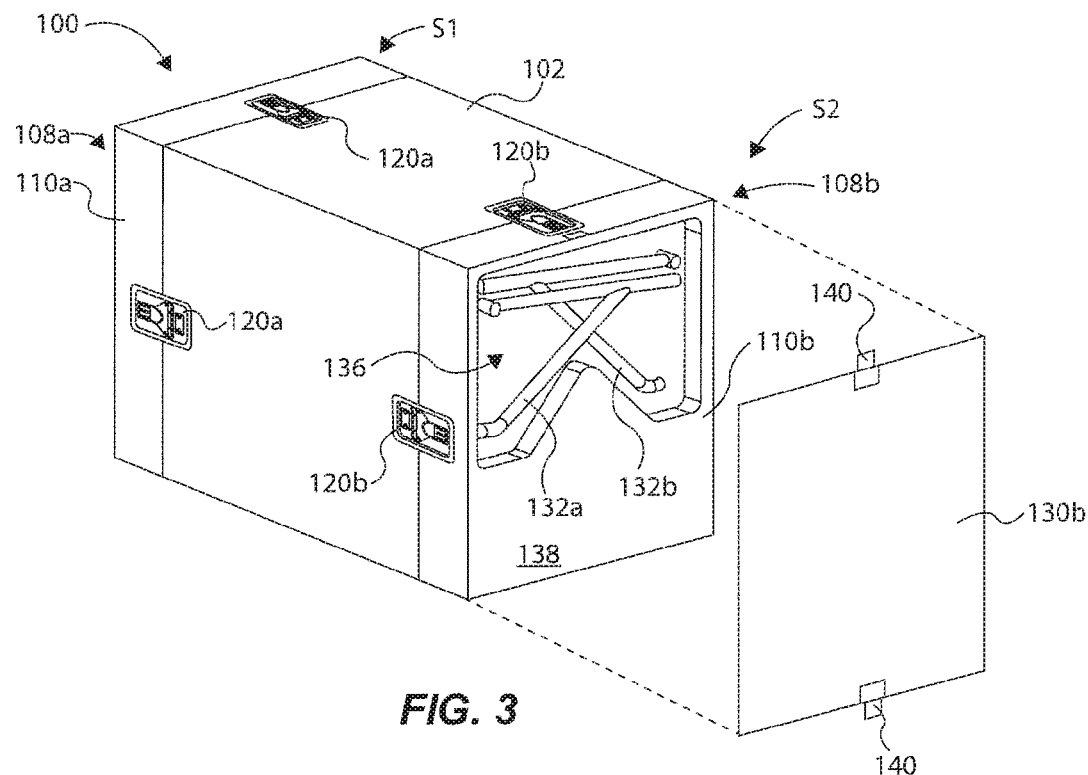
FIG. 3 illustrates a rear perspective view of the portable payload carrier of FIG. 1 in the stowed configuration, with a cover panel shown in an exploded position.
Figure 4:
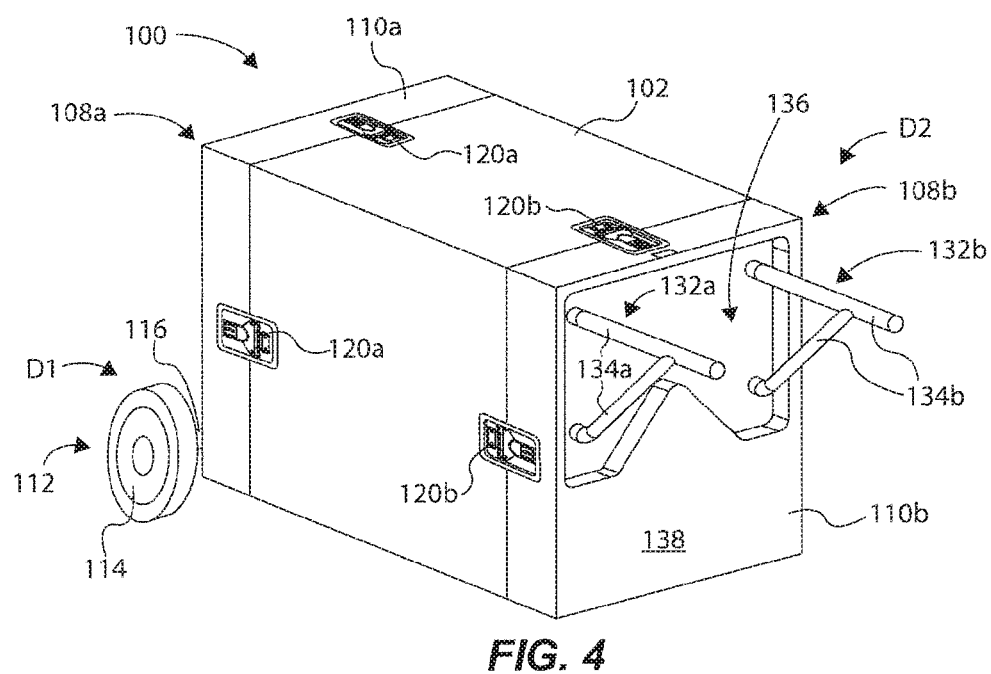
FIG. 4 illustrates a rear perspective view of the portable payload carrier of FIG. 1 in the deployed configuration.
Figure 5:
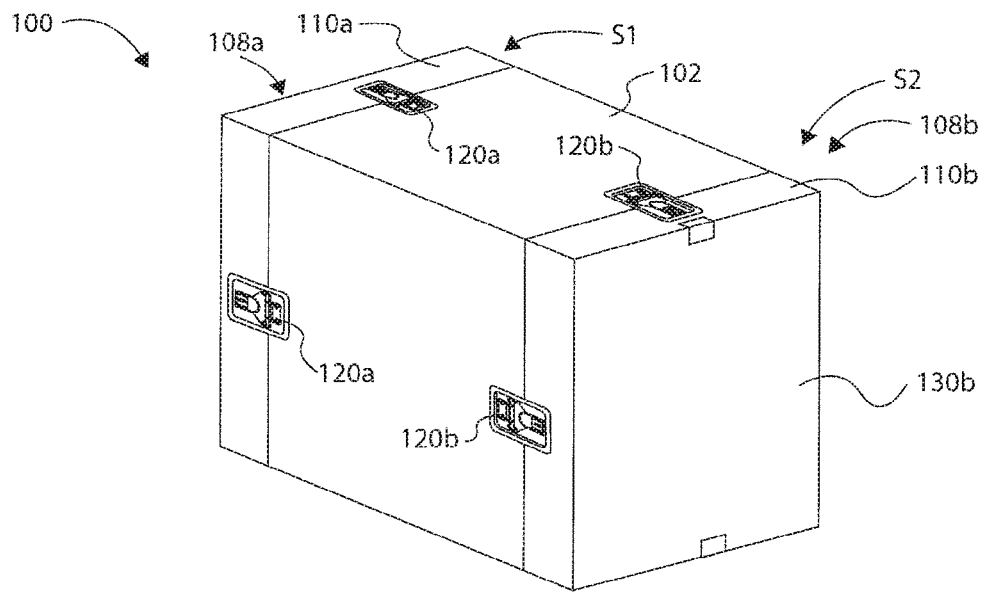
FIG. 5 illustrates a rear perspective view of the portable payload carrier of FIG. 1 in the stowed configuration.

The handles 632a and 632b can be similar to the handles of FIGS. 3 and 4, and can be coupled to the housing 602 by suitable means, such as illustrated by the coupling interfaces of the examples of FIGS. 7 and 8. For instance, the housing 602 can include bores 636 that receive ends of the handles 632a and 632b when in the stowed configuration S4 (e.g., like FIG. 8). Note that a single handle could be utilized, such as a horizontal cross bar that can be coupled to the housing 602 in a suitable manner, such as being received into bores of the housing 602. Note that, in the deployed configuration D4, the handles 632a and 632b can extend laterally away from the housing 602 on an opposite side relative to the side that the wheel 614 extends from.

In one example, the transport assembly 608 can comprise a cover panel 630 removably coupled to the transport unit 610 via attachment device(s) 632 (or by a hinge on one side of the cover panel 630). The cover panel 630 is operable by a user to cover and uncover the recessed area 624 for access to the wheel assembly 612 and the handles 632a and 632b, so that a user can deploy the wheel assembly 612 and the handles 632a and 632b in the deployed configuration D4 for ground transportation of the portable payload carrier 600. The cover panel 630 helps to reduce the likelihood of the wheel assembly 612 and the handles 632a and 632b from accidentally falling out of the transport unit 608, which can cause damage or injury, and can create FOD.

Note that a particular portable transport carrier of the present disclosure can comprise any number of suitable carriers that operate to support a payload. For instance, a portable transport carrier can comprise a shell or housing or container (e.g., tub, chest, case, luggage), or even merely a frame or chassis that supports a payload (e.g., a server rack, etc.).

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A ground transport assembly for facilitating ground transportation of a portable payload carrier, comprising:
a transport unit operable to be coupled to a housing of a portable payload carrier, the transport unit comprising a cross-sectional profile that matches a cross-sectional profile of the housing of the portable payload carrier at an interface between the transport unit and the housing of the portable payload carrier;
an attachment mechanism supported by the transport unit to facilitate attachment of the transport unit to the housing of the portable payload carrier; and
a wheel assembly supported by the transport unit, and comprising a wheel and at least one wheel support structure configured to support the wheel, wherein the wheel assembly is operable between a stowed configuration and a deployed configuration, wherein, when in the deployed configuration, the portable payload carrier is transportable about a ground surface via the wheel by a user.

2. The ground transport assembly of claim 1, wherein the wheel assembly further comprises at least one stabilizer arm operable with the wheel support structure to support the wheel when the wheel assembly is in the deployed configuration.

3. The ground transport assembly of claim 1, wherein the transport unit is operable to be coupled to a lateral side of the housing, and wherein the at least one wheel support structure is pivotally coupled to the transport unit, such that the wheel extends laterally away from the housing when in the deployed configuration for interfacing with the ground surface.

4. The ground transport assembly of claim 1, further comprising at least one handle coupleable to the portable payload carrier for grasping by the user for transporting the portable payload carrier when in the deployed configuration, wherein the at least one handle is supported about an opposite side of the portable payload carrier relative to the wheel when in the deployed configuration.

5. The ground transport assembly of claim 1, wherein the transport unit is operable to be coupled to at least one of a top side or a lateral side of the housing.

6. The ground transport assembly of claim 1, wherein the transport unit comprises a recessed area for retaining the wheel assembly, and, wherein the ground transport assembly further comprises a cover panel coupled to the transport unit and operable to cover and uncover the recessed area for access to the wheel assembly.

7. The ground transport assembly of claim 1, wherein the transport unit is removably coupleable to the housing via the attachment mechanism, such that the portable payload carrier maintains a form factor when the transport unit is coupled to the housing when the wheel assembly is in the stowed configuration.

8. The ground transport assembly of claim 1, wherein the transport unit comprises a cover of the housing operable between a covered position and an uncovered position, wherein the uncovered position facilitates exposing an inner area of the housing for access to the inner area, and wherein the covered position facilitates the cover covering the inner area.

9. The ground transport assembly of claim 1, wherein the attachment mechanism comprises at least one hinge and at least one latch operable to facilitate opening the portable payload carrier via opening the transport unit.

10. A portable payload carrier, comprising:
a housing for supporting at least one payload therein; and
a ground transport assembly coupled to the housing, and comprising a first transport unit in support of a wheel assembly, the wheel assembly comprising a wheel and at least one wheel support structure configured to support the wheel about the first transport unit,
a handle transport assembly having a second transport unit coupled to the housing opposite the first transport unit, the handle transport assembly comprising at least one handle supported by the second transport unit, the at least one handle operable between a stowed configuration and a deployed configuration, wherein the wheel assembly is operable between a stowed configuration and a deployed configuration, and wherein, when in the deployed configurations of the wheel assembly and the at least one handle, the at least one handle is graspable by a user to lift and move the portable payload carrier about a ground surface via the wheel.

11. The portable payload carrier of claim 10, wherein the at least one wheel support structure is pivotally coupled to the first transport unit to facilitate interfacing the wheel to the ground surface when in the deployed configuration.

12. The portable payload carrier of claim 10, wherein the first transport unit is coupled to a first lateral side of the housing, such that the wheel extends laterally away from the housing when in the deployed configuration for interfacing with the ground surface.

13. The portable payload carrier of claim 10, wherein the wheel assembly is pivotally coupled to the first transport unit and collapsible into a recessed area of the first transport unit, and wherein the at least one handle is pivotally coupled to the second transport unit and collapsible into a recessed area of the second transport unit.

14. The portable payload carrier of claim 10, wherein the housing comprises a left end and a right end, wherein the handle transport assembly is coupled to the left end, and wherein the ground transport assembly is coupled the right end.

15. The portable payload carrier of claim 10, wherein, when in the stowed configurations, the handle transport assembly and the ground transport assembly maintain a form factor of the portable payload carrier.

16. The portable payload carrier of claim 10, wherein the first and second transport units each comprise a cover for covering an inner area of the housing when the first and second transport units are attached to the housing.

17. The portable payload carrier of claim 10, wherein the first transport unit is interchangeable with a pre-existing transport unit coupleable to the housing and that is devoid of at least one wheel.

18. The portable payload carrier of claim 10, further comprising a first panel coupled to the first transport unit for covering the wheel assembly when in the stowed configuration, such that the portable payload carrier maintains a form factor when in the stowed configuration.

19. A method for transporting a portable payload carrier about a ground surface, comprising:
 obtaining a portable payload carrier comprising a housing and a ground transport assembly coupled to the housing, the ground transport assembly comprising a first transport unit and a wheel assembly supported by the first transport unit, wherein the wheel assembly is in a stowed configuration, the portable payload carrier further comprising a handle transport assembly comprising a second transport unit and at least one handle supported by the second transport unit;
 moving the wheel assembly from the stowed configuration to a deployed configuration, such that a wheel of the wheel assembly is interfaced to a ground surface;
 moving the at least one handle from a stowed configuration to a deployed configuration to facilitate lifting the portable payload carrier; and
 transporting the portable payload carrier about the ground surface via the wheel.

20. The method of claim 19, further comprising moving the wheel assembly and the at least one handle from respective deployed configurations to respective stowed configurations, thereby maintaining a form factor of the portable payload carrier.

21. The method of claim 19, further comprising removing a pre-existing cover from the housing via an attachment component of the housing, and attaching the ground transport assembly to the housing via the attachment component to replace the pre-existing cover.

22. A ground transport assembly for facilitating ground transportation of a portable payload carrier, comprising:
 a transport unit operable to be coupled to a housing of a portable payload carrier;
 an attachment mechanism supported by the transport unit to facilitate attachment of the transport unit to the housing of the portable payload carrier; and
 a wheel assembly supported by the transport unit, and comprising a wheel and at least one wheel support structure configured to support the wheel, wherein the wheel assembly is operable between a stowed configuration and a deployed configuration, wherein, when in the deployed configuration, the portable payload carrier is transportable about a ground surface via the wheel by a user,
 wherein the transport unit comprises a cover of the housing operable between a covered position and an uncovered position, wherein the uncovered position facilitates exposing an inner area of the housing for access to the inner area, and wherein the covered position facilitates the cover covering the inner area.

23. A ground transport assembly for facilitating ground transportation of a portable payload carrier, comprising:
 a transport unit operable to be coupled to a housing of a portable payload carrier;
 an attachment mechanism supported by the transport unit to facilitate attachment of the transport unit to the housing of the portable payload carrier; and
 a wheel assembly supported by the transport unit, and comprising a wheel and at least one wheel support structure configured to support the wheel, wherein the wheel assembly is operable between a stowed configuration and a deployed configuration, wherein, when in the deployed configuration, the portable payload carrier is transportable about a ground surface via the wheel by a user,
 wherein the attachment mechanism comprises at least one hinge and at least one latch operable to facilitate opening the portable payload carrier via opening the transport unit.

24. A method for transporting a portable payload carrier about a ground surface, comprising:
 obtaining a portable payload carrier comprising a housing and a ground transport assembly coupled to the housing, the ground transport assembly comprising a first transport unit and a wheel assembly supported by the first transport unit, wherein the wheel assembly is in a stowed configuration;
 removing a pre-existing cover from the housing via an attachment component of the housing, and attaching the ground transport assembly to the housing via the attachment component to replace the pre-existing cover;
 moving the wheel assembly from the stowed configuration to a deployed configuration, such that a wheel of the wheel assembly is interfaced to a ground surface; and transporting the portable payload carrier about the ground surface via the wheel.

\* \* \* \* \*